US012672205B2

(12) United States Patent
Godin et al.

(10) Patent No.: US 12,672,205 B2
(45) Date of Patent: Jun. 30, 2026

(54) RADIO BEARER RECONFIGURATION

(71) Applicant: Nokia Technologies Oy, Espoo (FI)

(72) Inventors: Philippe Godin, Massy (FR); David Navrátil, Espoo (FI); Esa Mikael Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 18/555,153

(22) PCT Filed: Mar. 10, 2022

(86) PCT No.: PCT/EP2022/056194
§ 371 (c)(1),
(2) Date: Oct. 12, 2023

(87) PCT Pub. No.: WO2022/218620
PCT Pub. Date: Oct. 20, 2022

(65) Prior Publication Data
US 2024/0206011 A1      Jun. 20, 2024

Related U.S. Application Data

(60) Provisional application No. 63/174,687, filed on Apr. 14, 2021.

(51) Int. Cl.
*H04W 76/40*          (2018.01)
*H04W 24/02*          (2009.01)
*H04W 76/30*          (2018.01)

(52) U.S. Cl.
CPC ........... *H04W 76/40* (2018.02); *H04W 24/02* (2013.01); *H04W 76/30* (2018.02)

(58) Field of Classification Search
CPC ...... H04W 76/40; H04W 76/30; H04W 24/02
See application file for complete search history.

(56) References Cited

U.S. PATENT DOCUMENTS

| | | | |
|---|---|---|---|
| 7,970,002 B2 | 6/2011 | Hu | |
| 7,986,664 B2 | 7/2011 | Fischer | |
| 8,699,398 B2 | 4/2014 | Newberg et al. | |
| 8,780,777 B2 | 7/2014 | Cai | |

(Continued)

FOREIGN PATENT DOCUMENTS

| | | |
|---|---|---|
| CN | 111901765 A | 11/2020 |
| WO | 2022/028677 A1 | 2/2022 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

(Continued)

*Primary Examiner* — Ajay Cattungal
(74) *Attorney, Agent, or Firm* — Nokia Technologies Oy

(57)          ABSTRACT

Disclosed is a method comprising receiving, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmitting, to the at least one terminal device, a message indicative of the reconfiguration.

16 Claims, 11 Drawing Sheets

(56) References Cited

U.S. PATENT DOCUMENTS

| | | | | |
|---|---|---|---|---|
| 10,560,876 | B2 | 2/2020 | Won et al. | |
| 2019/0053193 | A1* | 2/2019 | Park | H04W 74/004 |
| 2022/0132277 | A1* | 4/2022 | Shrivastava | H04W 76/28 |
| 2023/0261970 | A1* | 8/2023 | Fujishiro | H04W 40/02 |
| | | | | 370/312 |
| 2023/0276470 | A1* | 8/2023 | Di Girolamo | H04W 4/06 |
| | | | | 370/312 |
| 2023/0362960 | A1* | 11/2023 | Adjakple | H04W 4/08 |
| 2023/0396965 | A1* | 12/2023 | Shrivastava | H04W 80/02 |
| 2024/0015850 | A1* | 1/2024 | Fujishiro | H04W 28/02 |
| 2024/0356680 | A1* | 10/2024 | Di Girolamo | H04L 1/1822 |

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.

"Summary of Offline Discussion on MBS_Architecture", 3GPP TSG-RAN WG3 #109-e, R3-205496, Agenda: 22.1, Huawei, Aug. 17-28, 2020, 15 pages.

International Search Report and Written Opinion received for corresponding Patent Cooperation Treaty Application No. PCT/EP2022/056194, dated Jun. 17, 2022, 14 pages.

"Email discussion report for [Post113-e][054][MBS17] PTP/PTM dynamic switch and MRB type change", 3GPP TSG-RAN WG2 #113bis-e, R2-2103518, Agenda: 8.1.x.y, Ericsson, Apr. 12-20, 2021, pp. 1-27.

"Configuration and Dynamic switch between PTP and PTM", 3GPP TSG-RAN WG3 Meeting #110e, R3-206487, Agenda: 22.2.3, Lenovo, Nov. 2-12, 2020, 3 pages.

"3rd Generation Partnership Project; Technical Specification Group Radio Access Network; NG-RAN; Architecture description (Release 17)", 3GPP TS 38.401, V17.5.0, Jun. 2023, pp. 1-123.

"(TP for TS 38.300 & 38.401 & 38.470) Stage 2 for PTM-PTP switching", 3GPP TSG-RAN WG3#112, R3-211659, Agenda: 22.2.3, Nokia, May 17-27, 2021, pp. 1-7.

"Corrections for the establishment of F1-U ptp retransmission tunnels", 3GPP TSG-RAN WG3 #117-e, R3-225245, Ericsson, Aug. 15-24, 2022, 53 pages.

"Introduction of further multicast session flow on MRB type reconfiguration", 3GPP TSG-RAN WG3 #117bis-e, R3-226029, Ericsson, Oct. 10-18, 2022, 2 pages.

Office action received for corresponding Inidan Patent Application No. 202347076995, dated Mar. 3, 2025, 7 pages.

Office action received for corresponding European Patent Application No. 22713913.6, dated Mar. 25, 2026, 9 pages.

* cited by examiner

1200

1300

RADIO BEARER RECONFIGURATION

RELATED APPLICATION

This application was originally filed as PCT Application No. PCT/EP2022/056194, filed on Mar. 10, 2022, which claims priority from U.S. Provisional Application No. 63/174,687 filed on Apr. 14, 2021, each of which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized such that better usage of resources may be provided to one or more terminal devices.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmit, to the at least one terminal device, a message indicative of the reconfiguration.

According to another aspect, there is provided an apparatus comprising means for: receiving, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmitting, to the at least one terminal device, a message indicative of the reconfiguration.

According to another aspect, there is provided a method comprising: receiving, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmitting, to the at least one terminal device, a message indicative of the reconfiguration.

According to another aspect, there is provided a computer program comprising instructions for causing an apparatus to perform at least the following: receive, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmit, to the at least one terminal device, a message indicative of the reconfiguration.

According to another aspect, there is provided a computer readable medium comprising program instructions for causing an apparatus to perform at least the following: receive, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmit, to the at least one terminal device, a message indicative of the reconfiguration.

According to another aspect, there is provided a non-transitory computer readable medium comprising program instructions for causing an apparatus to perform at least the following: receive, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service; and transmit, to the at least one terminal device, a message indicative of the reconfiguration.

According to another aspect, there is provided an apparatus comprising at least one processor, and at least one memory including computer program code, wherein the at least one memory and the computer program code are configured, with the at least one processor, to cause the apparatus to: determine that at least one condition regarding providing a multicast communication service or a broadcast communication service to at least one terminal device is fulfilled; based on the determining, transmit, to a central unit, an indication for assisting the central unit in determining a reconfiguration having an effect on at least one radio bearer, the at least one radio bearer comprising at least a point-to-point leg for providing said service; and transmit, to the at least one terminal device, a set of data associated with the multicast communication service or the broadcast communication service by utilizing the at least one radio bearer.

According to another aspect, there is provided an apparatus comprising means for: determining that at least one condition regarding providing a multicast communication service or a broadcast communication service to at least one terminal device is fulfilled; based on the determining, transmitting, to a central unit, an indication for assisting the central unit in determining a reconfiguration having an effect on at least one radio bearer, the at least one radio bearer comprising at least a point-to-point leg for providing said service; and transmitting, to the at least one terminal device, a set of data associated with the multicast communication service or the broadcast communication service by utilizing the at least one radio bearer.

According to another aspect, there is provided a method comprising: determining that at least one condition regarding providing a multicast communication service or a broadcast communication service to at least one terminal device is fulfilled; based on the determining, transmitting, to a central unit, an indication for assisting the central unit in determining a reconfiguration having an effect on at least one radio bearer, the at least one radio bearer comprising at least a point-to-point leg for providing said service; and transmitting, to the at least one terminal device, a set of data associated with the multicast communication service or the broadcast communication service by utilizing the at least one radio bearer.

According to another aspect, there is provided a computer program comprising instructions for causing an apparatus to perform at least the following: determine that at least one condition regarding providing a multicast communication service or a broadcast communication service to at least one terminal device is fulfilled; based on the determining, transmit, to a central unit, an indication for assisting the central unit in determining a reconfiguration having an effect on at least one radio bearer, the at least one radio bearer comprising at least a point-to-point leg for providing said service; and transmit, to the at least one terminal device, a set of data associated with the multicast communication service or the broadcast communication service by utilizing the at least one radio bearer.

According to another aspect, there is provided a computer readable medium comprising program instructions for causing an apparatus to perform at least the following: determine that at least one condition regarding providing a multicast communication service or a broadcast communication service to at least one terminal device is fulfilled; based on the determining, transmit, to a central unit, an indication for assisting the central unit in determining a reconfiguration having an effect on at least one radio bearer, the at least one radio bearer comprising at least a point-to-point leg for providing said service; and transmit, to the at least one terminal device, a set of data associated with the multicast communication service or the broadcast communication service by utilizing the at least one radio bearer.

According to another aspect, there is provided a non-transitory computer readable medium comprising program instructions for causing an apparatus to perform at least the following: determine that at least one condition regarding providing a multicast communication service or a broadcast communication service to at least one terminal device is fulfilled; based on the determining, transmit, to a central unit, an indication for assisting the central unit in determining a reconfiguration having an effect on at least one radio bearer, the at least one radio bearer comprising at least a point-to-point leg for providing said service; and transmit, to the at least one terminal device, a set of data associated with the multicast communication service or the broadcast communication service by utilizing the at least one radio bearer.

According to another aspect, there is provided a system comprising at least a distributed unit, a central unit, and at least one terminal device. The distributed unit is configured to: determine that at least one condition regarding providing a multicast communication service or a broadcast communication service to the at least one terminal device is fulfilled; based on the determining, transmit, to the central unit, an indication for assisting the central unit in determining a reconfiguration having an effect on at least one radio bearer, the at least one radio bearer comprising at least a point-to-point leg for providing said service; and transmit, to the at least one terminal device, a set of data associated with the multicast communication service or the broadcast communication service by utilizing the at least one radio bearer. The central unit is configured to: receive, from the distributed unit, the indication for assisting in determining the reconfiguration; and transmit, to the at least one terminal device, a message indicative of the reconfiguration. The at least one terminal device is configured to: receive, from the central unit, the message indicative of the reconfiguration; and receive, from the distributed unit, the set of data associated with the multicast communication service or the broadcast communication service by utilizing the at least one radio bearer.

According to another aspect, there is provided a system comprising at least a distributed unit, a central unit, and at least one terminal device. The distributed unit comprises means for: determining that at least one condition regarding providing a multicast communication service or a broadcast communication service to the at least one terminal device is fulfilled; based on the determining, transmitting, to the central unit, an indication for assisting the central unit in determining a reconfiguration having an effect on at least one radio bearer, the at least one radio bearer comprising at least a point-to-point leg for providing said service; and transmitting, to the at least one terminal device, a set of data associated with the multicast communication service or the broadcast communication service by utilizing the at least one radio bearer. The central unit comprises means for: receiving, from the distributed unit, the indication for assisting in determining the reconfiguration; and transmitting, to the at least one terminal device, a message indicative of the reconfiguration. The at least one terminal device comprises means for: receiving, from the central unit, the message indicative of the reconfiguration; and receiving, from the distributed unit, the set of data associated with the multicast communication service or the broadcast communication service by utilizing the at least one radio bearer.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
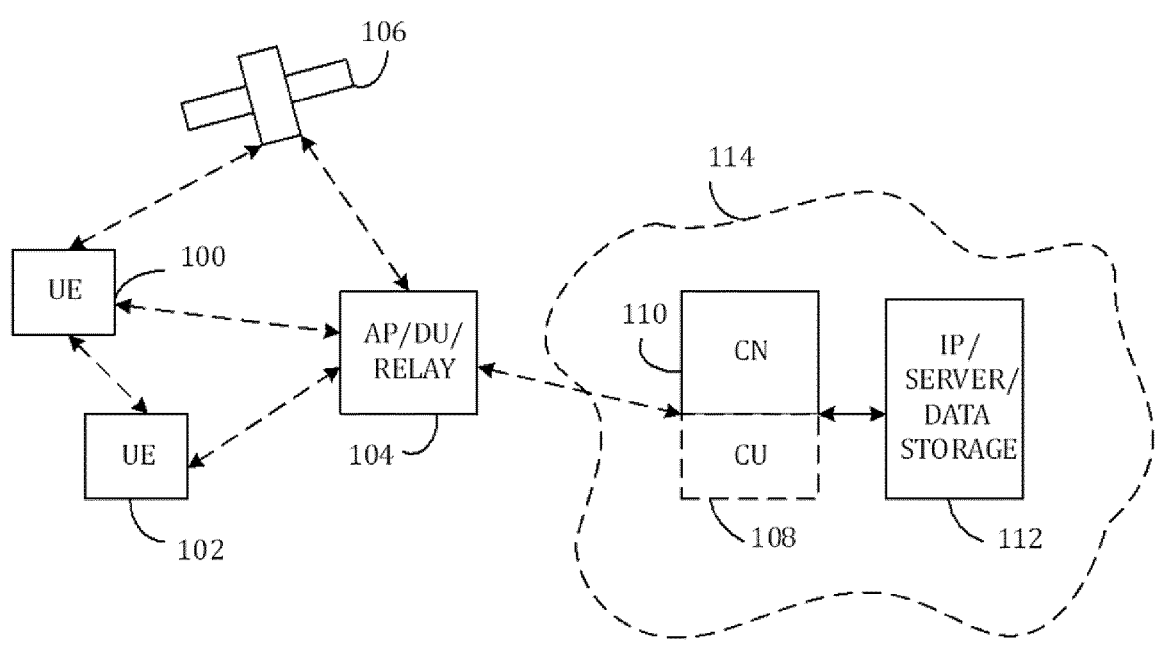
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A base station such as a gNB may be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the base station. The DU may be defined as a logical node hosting radio link control (RLC), medium access control (MAC) and/or physical (PHY) layers of the base station. The operation of the DU may be at least partly controlled by the CU. The CU may comprise a control plane (CU-CP), which may be defined as a logical node hosting the RRC and the control plane part of the PDCP protocol of the CU for the base station. The CU may further comprise a user plane (CU-UP), which may be defined as a logical node hosting the user plane part of the PDCP protocol and the SDAP protocol of the CU for the base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform.

Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

NR may support multicast and broadcast services (MBS). A broadcast service is a communication service, in which a specific service and specific content data are provided substantially simultaneously to the UEs in the broadcast coverage area (i.e. all UEs in the broadcast coverage area are authorized to receive the data). A multicast service is a communication service, in which a specific service and specific content data are provided substantially simultaneously to a dedicated set of UEs that are specifically authorized to receive the data (i.e. not all UEs in the multicast coverage area may be authorized to receive the data).

Currently, two delivery modes may be available for transmitting MBS data over radio: a point-to-point (PTP) mode and a point-to-multipoint (PTM) mode. In PTP mode, the RAN node delivers separate copies of MBS data packets over radio to individual UEs. In PTM mode, the RAN node delivers a single copy of MBS data packets over radio to a set of UEs. The RAN node may use a combination of the PTP and PTM modes to deliver an MBS packet to UEs.

The switching between PTP mode and PTM mode may be controlled in a RAN node such as a DU. One or more criteria may be used for the DU to decide between PTP mode and PTM mode. Such criteria may comprise, for example, L1 measurement feedback and/or the number of UEs involved in a particular MBS session. An MBS session refers to a session for delivering a multicast communication service or a broadcast communication service. In order for the DU to be able to decide a switch between PTP mode and PTM mode, the UE may be configured with a split common radio bearer using a common PDCP, i.e. one common PDCP entity in the CU shared with the multiple UEs. The split common radio bearer may also be referred to as an MBS split common bearer, a PDCP split common bearer, or an MBS PDCH split common bearer. The split common radio bearer may comprise one leg over PTP RLC and one leg over PTM RLC. Herein a leg may refer to a radio link. The switch between PTP mode and PTM mode may refer to the DU deciding, based on the one or more criteria, which RLC leg of the PDCP split common radio bearer configuration is to be used for the coming packets for a given UE.

However, the delivery of multicast data (e.g. MBS data) over PTP for a UE may also be achieved in single-bearer PTP. Herein a single-bearer may also be referred to as a non-split radio bearer. In a single-bearer configuration, the UE may be configured by RRC with the RLC PTP leg, but not the RLC PTM leg. The single-bearer configuration may be achieved by using a common radio bearer with only the PTP leg configured, or by using dedicated radio bearers (i.e. dedicated PDCP entity in the CU per UE, also called DRB) with only the PTP leg configured. The single-bearer configuration may be beneficial from the radio resource management perspective, because the configuration of common frequency resource (CFR) used for PTM transmission does not need to be determined and possibly later changed (for example due to another MBS session configured in the same or overlapping CFR becoming active), when the likelihood of using PTM is low. The configuration of CFR comprises at least one or more of the following: a control resource set (CORESET), a search space, and/or a common reference for frequency domain resource assignment. Not configuring the RLC PTM leg may be beneficial when first UEs are joining an MBS session, when the initial selected CFR may not be the most suitable CFR at the time when PTM transmission is actually considered to provide better spectral efficiency. Therefore, configuring all UEs in split common radio bearer during the full time of the MBS session may not be optimal if, for example, all UEs in the cell happen to be receiving the MBS session over an RLC PTP leg. In this case, the DU may not be able to make the switch between PTP mode and PTM mode by itself, and the CU needs to be involved.

Figure 2A:
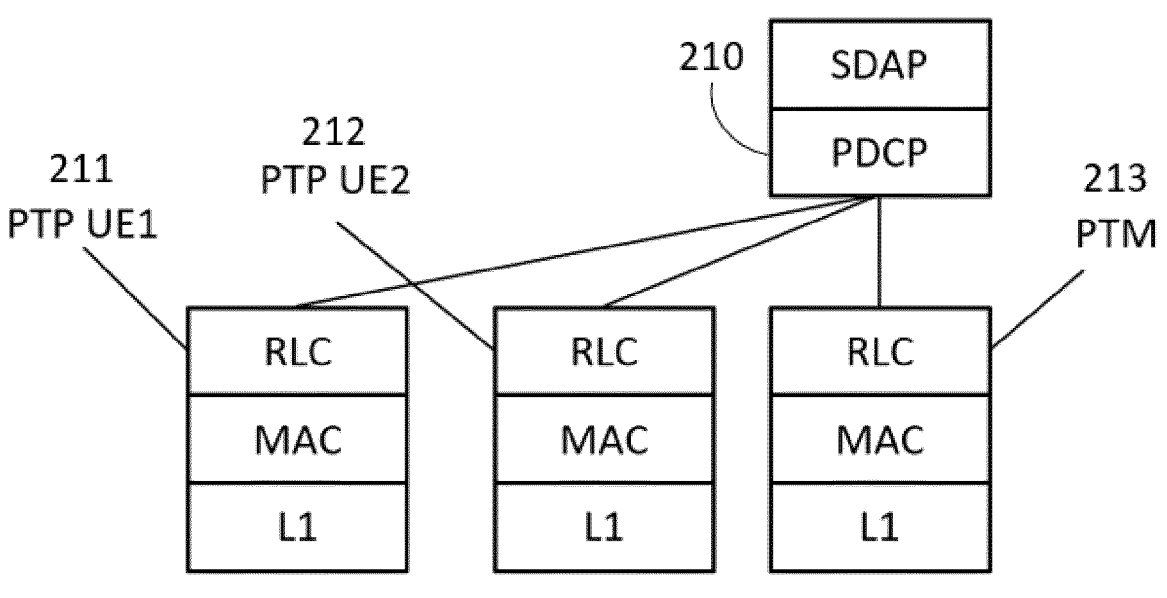
FIGS. 2A, 2B and 3 illustrate radio bearers.

FIG. 2A illustrates a split common radio bearer, which may be utilized in some exemplary embodiments. In the split common radio bearer, one common PDCP entity 210 in the CU is shared with multiple UEs. The split common radio bearer comprises a PTM leg 213, as well as at least one PTP leg 211, 212 per UE. For example, the split common radio bearer may comprise a first PTP leg 211 for a first UE (UE1) and a second PTP leg 212 for a second UE (UE2). In other words, PDCP protocol data units (PDUs) may be transmitted to a given UE either via the respective PTP leg or via the PTM leg. The legs may comprise RLC entities, and the legs may thus be called RLC legs, as mentioned above.

Figure 2B:
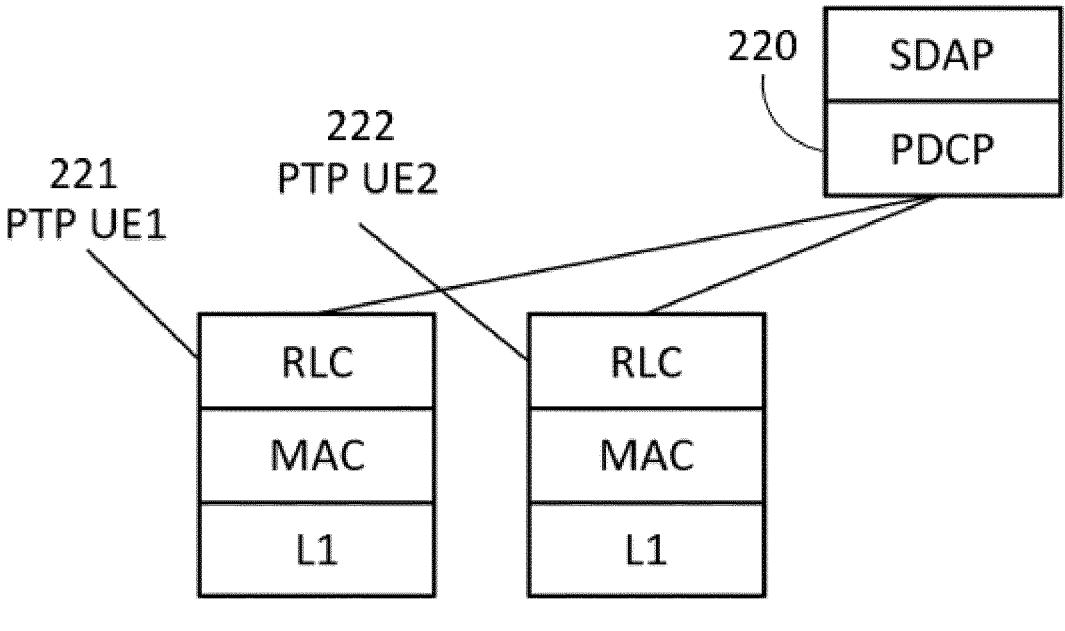

FIG. 2B illustrates a common radio bearer without a PTM leg. The common radio bearer illustrated in FIG. 2B may also be utilized in some exemplary embodiments. The common radio bearer without the PTM leg may also be referred to as a common PDCP bearer, a single-bearer, or a non-split bearer herein. In the common radio bearer, one common PDCP entity 220 in the CU is shared with multiple UEs. The common radio bearer comprises at least one PTP leg 221, 222 per UE. For example, the common radio bearer may comprise a first PTP leg 221 for a first UE (UE1) and a second PTP leg 222 for a second UE (UE2). In other words, PDCP PDUs may be transmitted to a given UE via the respective PTP leg. The legs may comprise RLC entities, and the legs may thus be called RLC legs, as mentioned above.

Figure 3:
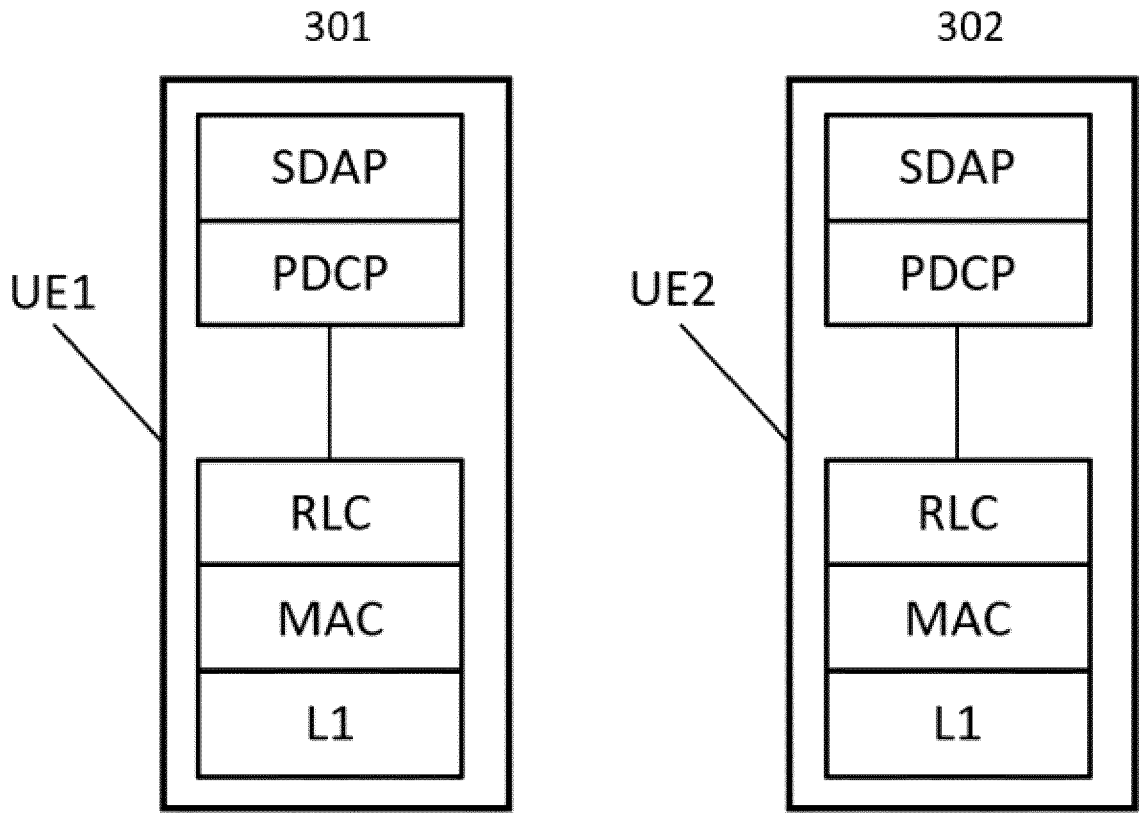

FIG. 3 illustrates dedicated radio bearers (DRBs), which may be utilized in some exemplary embodiments. As mentioned above, a DRB may also be referred to as a single-bearer or a non-split bearer herein. There may be at least one DRB configured per UE with a dedicated PDCP entity in the CU per UE. For example, a first DRB 301 may comprise a first PDCP entity and a first PTP leg for transmitting PDCP PDUs to a first UE (UE1). A second DRB 302 may comprise a second PDCP entity and a second PTP leg for transmitting PDCP PDUs to a second UE (UE2).

Referring to FIGS. 2A, 2B and 3, the service data adaptation protocol (SDAP) is responsible for quality of service (QoS) flow handling across a (5G) air interface. For example, SDAP may map a specific QoS Flow within a PDU session to a corresponding DRB (which has been established with the appropriate level of QoS). In addition, SDAP may mark the transmitted packets with the correct QoS flow identifier, ensuring that the packet receives the correct forwarding treatment as it traverses the communication system. SDAP may be hosted in the CU of a split base station.

PDCP may provide the following services to upper layers: transfer of user plane data, transfer of control plane data, header compression of internet protocol (IP) packets, ciphering, and/or integrity protection. The PDCP layer is running on top of the RLC layer. A PDCP entity which is used to perform the PDCP functions can be configured either with both transmitting and receiving sides (for a bidirectional radio bearer), or only one of them (for a unidirectional radio bearer). PDCP may be hosted in the CU of a split base station.

The RLC protocol may provide control of the radio link between the UE and the split base station. The RLC protocol may transfer upper layer PDUs for example in one of the three different operation modes: acknowledged mode (AM), unacknowledged mode (UM) and transparent mode (TM) for which no header is added to data. The RLC may be hosted in the DU(s) of a split base station.

The medium access control (MAC) protocol may provide at least some of the following functionalities: multiplexing RLC frames from multiple instances in a transport block, allocating radio resources via a scheduling mechanism for both transmission directions, managing retransmission in the case of error via the hybrid automatic repeat request (HARQ) mechanism, and/or managing the random access procedure. The MAC protocol may be hosted in the DU(s) of a split base station.

L1, i.e. the physical layer (PHY), interacts with actual hardware and signaling mechanisms. It defines the hardware equipment, cabling, wiring, frequencies, and/or pulses used to represent binary signals, and so on. L1 may be hosted in the DU(s) and/or in the RU(s) of a split base station.

Figure 4:
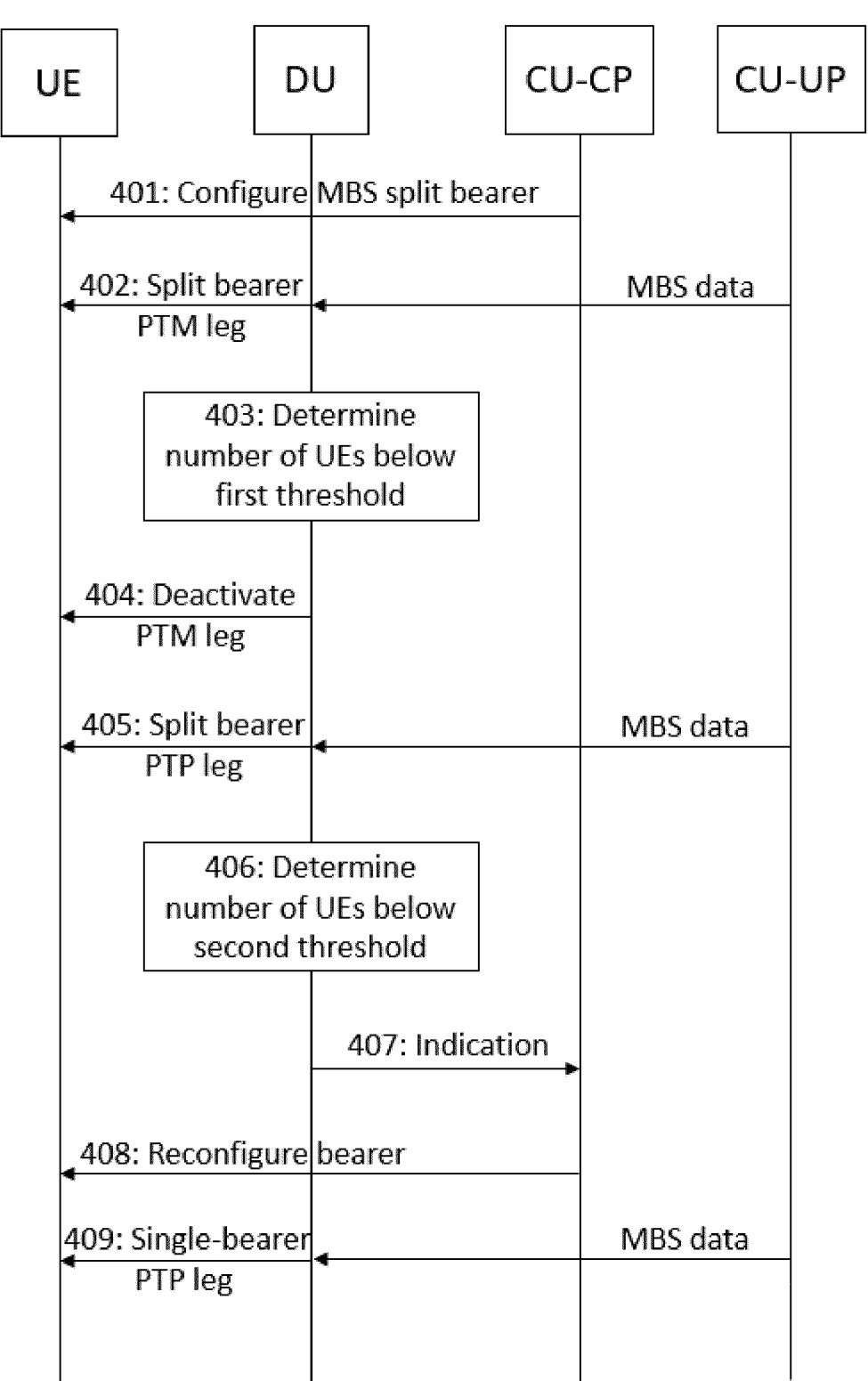
FIGS. 4-8 illustrate signaling diagrams according to some exemplary embodiments.

FIG. 4 illustrates a signaling diagram according to an exemplary embodiment, wherein a DU may assist a CU in switching between single and split common radio bearer configuration for MBS. This exemplary embodiment may be applied for example in a scenario, where an MBS session delivery over RLC PTM leg is used in a cell, and all UEs in the cell have been RRC configured 401 by the CU-CP with split common radio bearers sharing a common PDCP entity. The UEs receive 402 an MBS session from the DU over the split common radio bearer RLC PTM leg.

The DU may determine to reconfigure some or all of the UEs from split common radio bearer PTM leg to split common radio bearer PTP leg for example based on L1 measurement reports provided by the UEs. The L1 measurement reports may comprise radio measurement information such as reference signal received power (RSRP) and/or channel state information measured by the UEs. For example, if the DU determines 403 that the number of UEs, which are still using PTM or are evaluated to benefit from PTM (considering also radio measurements), is below a first pre-defined threshold value denoted as N1, then the DU selects 404 split common radio bearer RLC PTP leg instead of split common radio bearer RLC PTM leg for the transmission of MBS data for some or all of the UEs in the cell. The selection 404 to the RLC PTP leg may be performed by deactivating the reception, i.e. at least physical downlink control channel (PDCCH) decoding, of the RLC PTM leg. As a non-limiting example, N1 may be equal to 10. If the number of UEs using or benefitting from PTM falls down to 9, i.e. below the first threshold N1=10 in this example, then the DU instructs some or all of the UEs to deactivate their RLC PTM leg. The some or all UEs are still configured with the split common radio bearer and receive 405 an MBS session from the DU over the split common radio bearer RLC PTP leg.

The DU may expect that conditions will improve or the DU may wait for some time and observe whether conditions will change, and thus the DU maintains the UEs in the split common bearer PTP mode. For example, if the DU determines that two more UEs could benefit from PTM, thus raising the number of UEs benefitting from PTM up to 11 (9+2>10), i.e. back above N1 (or at least to a number equaling N1), then the DU may reconfigure some or all of the UEs in the cell from split common radio bearer PTP back to split common radio bearer PTM, i.e. to activate the RLC PTM leg.

On the other hand, the DU may determine that the situation will not improve or not improve enough at least in the near term, and that the operation of the DU is not substantially impacted if the RLC PTM leg is not activated. However, the CU is not aware of this situation, and thus the DU may assist the CU in controlling the reconfiguration from split common radio bearer configuration and single-bearer configuration for some or all of the UEs receiving an MBS session in the cell. As mentioned previously, a single-bearer may comprise a PTP leg, but not a PTM leg. If the DU determines 406 that the number of UEs, which are evaluated to benefit from PTM (e.g. considering also radio measurements), is below a second pre-defined threshold value denoted as N2, then the DU transmits 407 an indication to the CU-CP to assist the CU-CP in determining to reconfigure some or all of the UEs in the cell from split common radio bearer PTP to single-bearer (e.g. single bearer PTP). As a non-limiting example, N2 may be equal to five. If the number of UEs falls below N2=5 in this example, then the DU may determine that the probability to be able to cross above (or becoming at least equal to) N1 again is very low. Thus, the DU determines that it is beneficial to de-configure the split common radio bearer and have single-bearer configured instead for some or all of the UEs. The single-bearer may be configured either by reconfiguring the common radio bearer into having only the PTP leg configured (i.e. by releasing the PTM leg from the common radio bearer), or by using dedicated radio bearers (i.e. dedicated PDCP entity in the CU per UE, also called DRB) with only the PTP leg configured. The DU then transmits 407 the indication to the CU-CP.

Upon receiving 407 the indication from the DU, the CU-CP determines to reconfigure some or all of the UEs from split common radio bearer PTP to single-bearer (PTP), and transmits 408 the reconfiguration to some or all of the UEs in order to release their RLC PTM leg. The some or all UEs release their RLC PTM leg and receive 409 an MBS session from the DU over the single-bearer RLC PTP leg.

The assistance information, i.e. the indication 407 to reconfigure the UEs to single-bearer, from the DU to the CU may be beneficial for example in a situation, where a considerable number of UEs are receiving MBS in the cell (and thus the CU determines that it is beneficial to have PTM configured), but at the same time many of those UEs are in bad radio conditions that are not predicted to improve anytime soon. In this case, the CU cannot make the decision alone to reconfigure the UEs to use single-bearer (PTP leg), since the CU does not have access to the L1 measurements.

Figure 5:
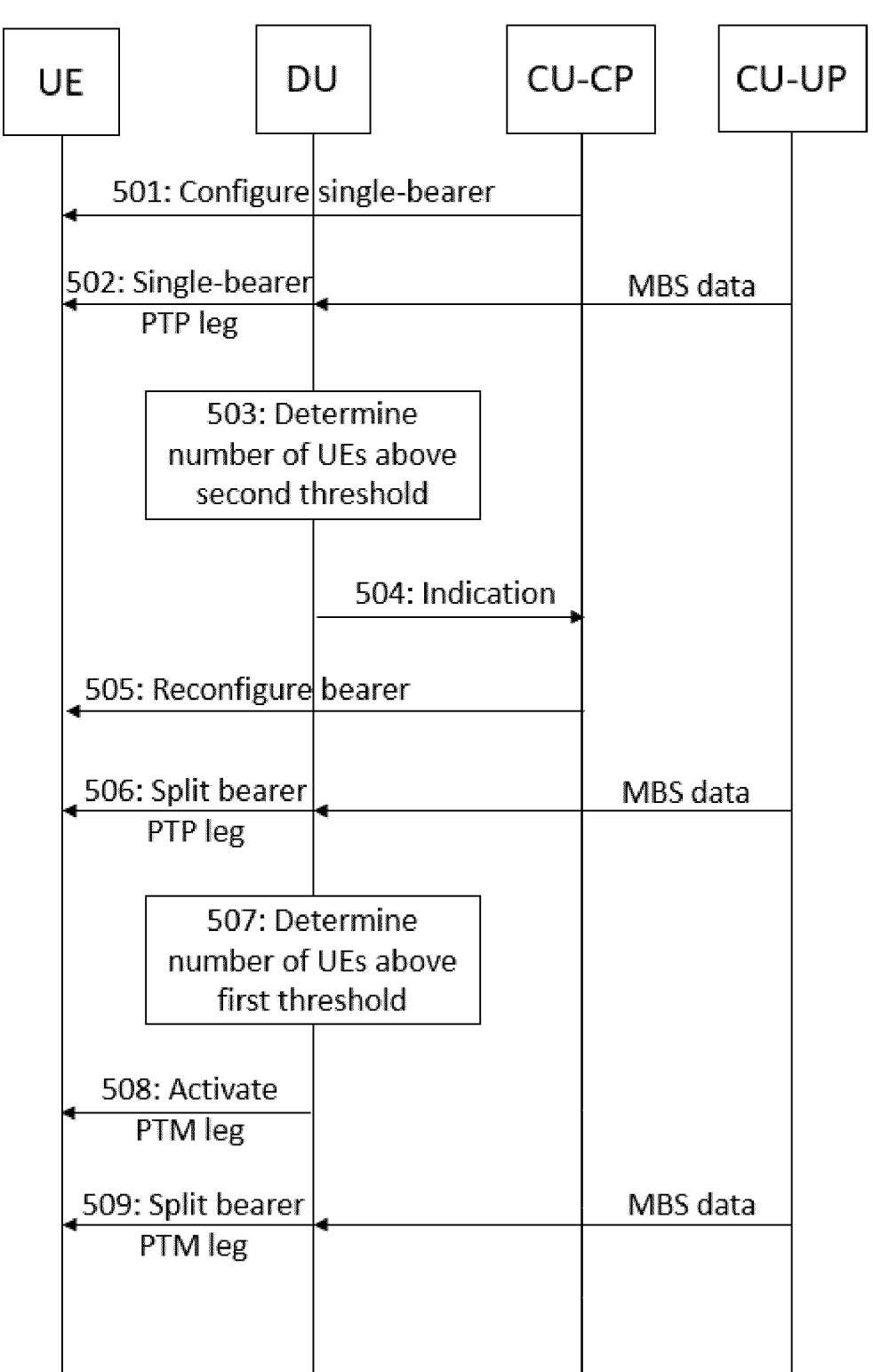

FIG. 5 illustrates a signaling diagram according to another exemplary embodiment, wherein single-bearer RLC PTP legs are initially configured 501 for some or all UEs in the cell, and MBS data is transmitted 502 from the DU to the some or all UEs via the single-bearer PTP leg. If the DU determines 503 that PTM transmission using the RLC PTM leg of the split common radio bearer could become more beneficial than the PTP leg, for example if the number of UEs evaluated to benefit from PTM exceeds (e.g. is above or at least equal to) a second pre-defined threshold value (for example N2=5), then the DU may transmit 504 an indication to the CU for assisting the CU in determining to reconfigure 505 some or all of the UEs to use split common radio bearer PTP. In other words, the PTM leg is set up, but not activated yet. MBS data may be transmitted 506 from the DU to the some or all UEs via the split common radio bearer PTP leg.

If the number of UEs evaluated to benefit from PTM then further increases and exceeds (e.g. is above or at least equal to) a first pre-defined threshold value (for example N1=10), then the DU may activate 508 the PTM leg of the split common radio bearer for the some or all UEs, and transmit 509 MBS data to the some or all UEs via the split common radio bearer PTM leg.

In some exemplary embodiments, the indication 407, 504 transmitted from the DU to the CU may comprise the L1 measurements of the UEs. In other words, the L1 measurements may be forwarded from the DU to the CU.

Some exemplary embodiments may also be applied for reconfiguration between a unicast bearer, i.e. a dedicated radio bearer (DRB), and the split common radio bearer for the delivery of user payload of an MBS session.

Figure 6:
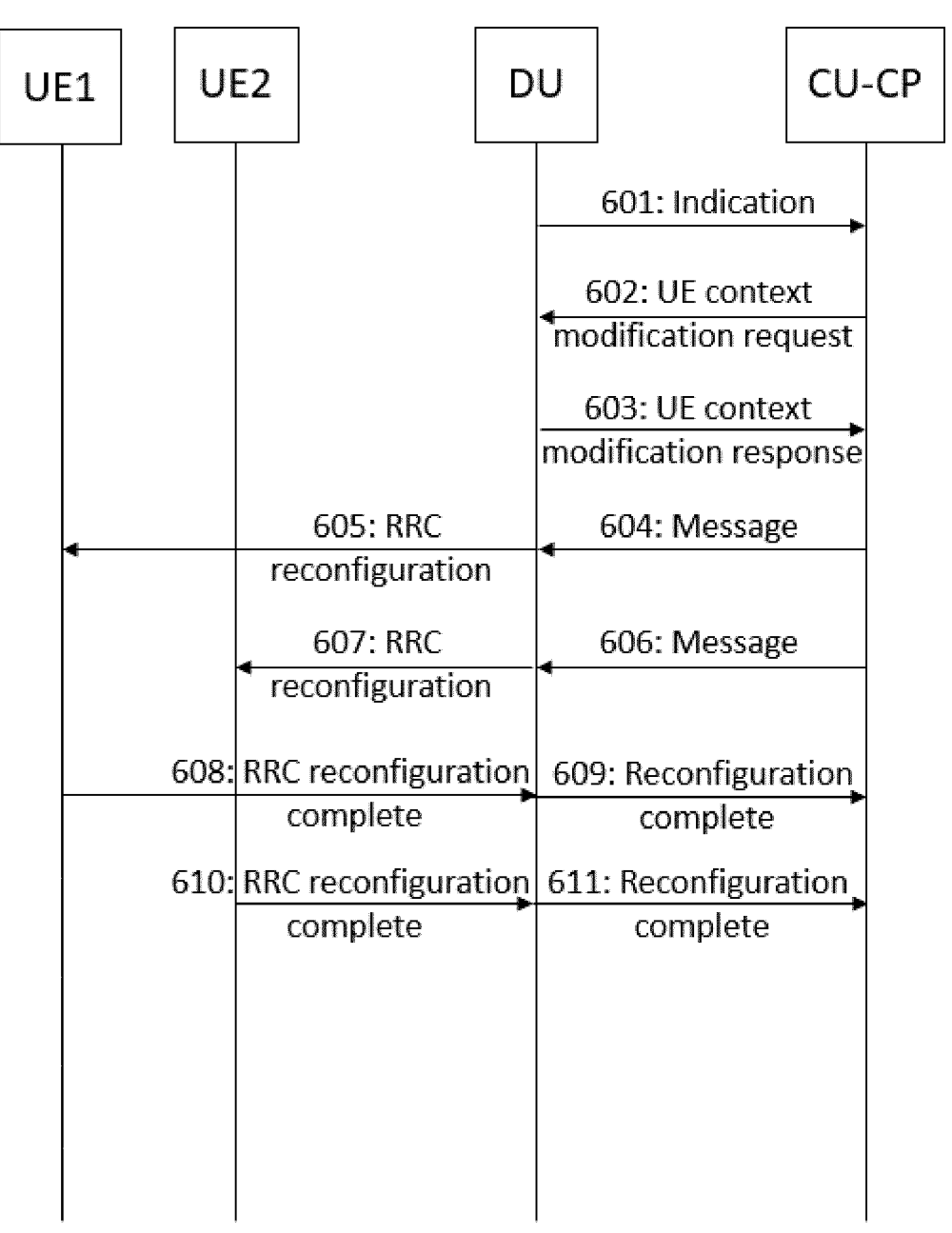

FIG. 6 illustrates a signaling diagram according to another exemplary embodiment, wherein a plurality of UEs are reconfigured by using multiple individual RRC reconfiguration messages. The plurality of UEs comprises at least a first UE (UE1) and a second UE (UE2). Referring to FIG. 6, a DU transmits 601 an indication to a CU-CP for assisting the CU-CP in determining a reconfiguration for at least one radio bearer associated with the plurality of UEs. For example, the indication may comprise a request for triggering the CU-CP to reconfigure the at least one radio bearer from split common radio bearer to single-bearer (i.e. to release the PTM leg), or from single-bearer to split common radio bearer (i.e. to set up the PTM leg). The indication 601 may be transmitted, for example, in an FIC non-UE-associated message.

The CU-CP transmits 602 a "UE Context Modification Request" message to the DU, wherein the "UE Context Modification Request" message comprises instructions on reconfiguring the at least one radio bearer.

The DU transmits 603 a "UE Context Modification Response" message to the CU-CP. The "UE Context Modification Response" message comprises the configuration of the lower layers (PHY, MAC and RLC) associated with the reconfiguration of the at least one radio bearer. In other words, a part of the reconfiguration, i.e. the configuration of the lower layers, is associated with the DU, and this part of the reconfiguration is transmitted from the DU to the CU-CP for example in the "UE Context Modification Response" message.

The CU then generates multiple individual RRC reconfiguration messages (one per UE) indicative of the bearer reconfiguration to be transmitted to the plurality of UEs. The RRC reconfiguration messages include the part provided by the DU. The RRC reconfiguration messages are processed by the PDCP entity in the CU. In other words, a PDCP PDU is generated, where the data part is encrypted and the whole PDU integrity is protected. Each encrypted PDCP PDU is transmitted 604, 606 to the DU encapsulated for example into another "UE Context Modification Request" F1AP message, or into a "DL RRC Message Transfer" F1AP message. The DU receives 604, 606 each PDCP PDU, delivers it to its RLC entity, which processes it and passes it to the MAC entity and then to the PHY layer, which transmits 605, 607 it to the respective UE in an individual RRC reconfiguration message. In other words, the CU transmits, to the DU, a message encapsulating, or comprising, an individual RRC reconfiguration message indicative of the bearer reconfiguration, and the DU then transmits the individual RRC reconfiguration message to the respective UE.

The plurality of UEs reconfigure the at least one radio bearer based on the RRC reconfiguration message, and transmit 608, 610 an RRC reconfiguration complete message to the DU. The DU indicates 609, 611 to the CU that the reconfiguration is complete.

In another exemplary embodiment, the part of the reconfiguration associated with the DU, i.e. the configuration of the lower layers, may be transmitted as part of the assistance information, i.e. within the indication 601 or together with the indication 601, for assisting the CU-CP in determining a reconfiguration for at least one radio bearer associated with at least one UE. Thus, the "UE Context Modification Request" message 602 and the "UE Context Modification Response" message 603 may not be needed in this exemplary embodiment.

Figure 7:
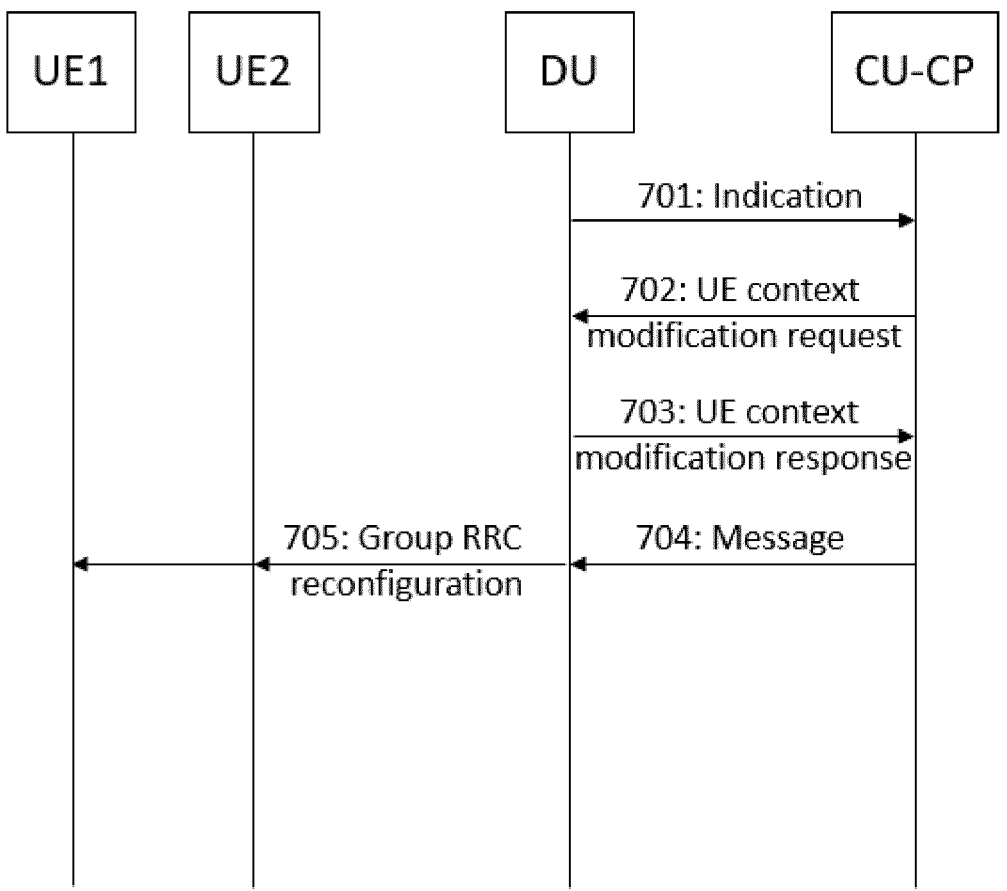

FIG. 7 illustrates a signaling diagram according to another exemplary embodiment, wherein a plurality of UEs are reconfigured by using a group RRC reconfiguration message. The plurality of UEs comprises at least a first UE (UE1) and a second UE (UE2). Referring to FIG. 7, a DU transmits 701 an indication to a CU-CP for assisting the CU-CP in determining a reconfiguration for at least one radio bearer associated with the plurality of UEs. For example, the indication may comprise a request to reconfigure the at least one radio bearer from split common radio bearer to single-bearer (i.e. to release the PTM leg), or from single-bearer to split common radio bearer (i.e. to set up the PTM leg). The indication 701 may be transmitted, for example, in an FIC non-UE-associated message.

The CU-CP transmits 702 a "UE Context Modification Request" message to the DU, wherein the "UE Context Modification Request" message comprises instructions on reconfiguring the at least one radio bearer.

The DU transmits 703 a "UE Context Modification Response" message to the CU-CP. The "UE Context Modification Response" message comprises the configuration of the lower layers (PHY, MAC and RLC) associated with the reconfiguration of the bearer. In other words, a part of the reconfiguration, i.e. the configuration of the lower layers, is associated with the DU, and this part of the reconfiguration is transmitted from the DU to the CU-CP for example in the "UE Context Modification Response" message.

The CU-CP generates the group RRC reconfiguration message indicative of the bearer reconfiguration, and transmits 704 a message encapsulating, or comprising, the group RRC reconfiguration message to the DU. The DU transmits 705 the group RRC reconfiguration message indicative of the bearer reconfiguration to the plurality of UEs.

In another exemplary embodiment, the part of the reconfiguration associated with the DU, i.e. the configuration of the lower layers, may be transmitted as part of the assistance information, i.e. within the indication 701 or together with the indication 701, for assisting the CU-CP in determining a reconfiguration for at least one radio bearer associated with at least one UE. Thus, the "UE Context Modification Request" message 702 and the "UE Context Modification Response" message 703 may not be needed in this exemplary embodiment.

Figure 8:
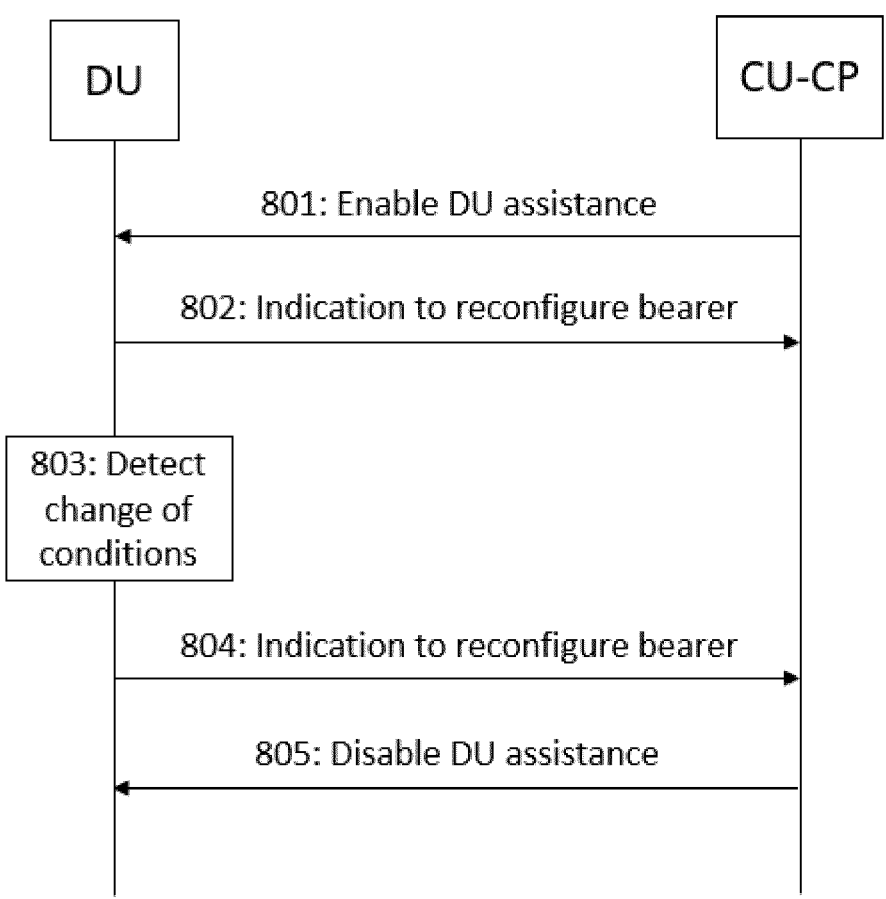

FIG. 8 illustrates a signaling diagram according to another exemplary embodiment. A CU-CP transmits a first request to a DU to enable 801 DU assistance for reconfiguring at least one radio bearer associated with at least one UE. If the DU determines that it is beneficial to reconfigure the at least one bearer, the DU transmits 802 a first indication to the CU-CP to assist the CU-CP in determining a reconfiguration for the at least one bearer. The DU then detects 803 a change in radio conditions associated with the at least one UE for example based on L1 measurement reports provided by the at least one UE. Based on the detecting, the DU transmits

804 a second indication to the CU-CP to assist the CU-CP in determining another reconfiguration for the at least one bearer. The CU-CP may transmit later on a second request to the DU if it decides to disable 805 the DU assistance.

Figure 9:
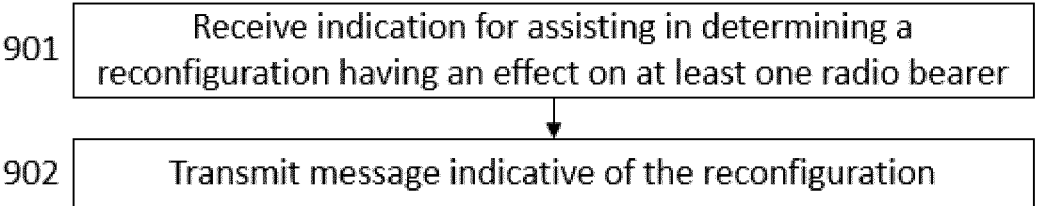
FIGS. 9-11 illustrate flow charts according to some exemplary embodiments.

FIG. 9 illustrates a flow chart according to another exemplary embodiment. The functions illustrated in FIG. 9 may be performed by an apparatus such as, or comprised in, a CU. Referring to FIG. 9, an indication is received 901 from a DU for assisting in determining a reconfiguration having an effect on at least one radio bearer for providing a multicast communication service or a broadcast communication service to at least one UE, wherein the at least one radio bearer comprises at least a PTP leg for providing said service. For example, the at least one radio bearer may comprise a split common radio bearer and/or a single-bearer (i.e. a non-split radio bearer). A message indicative of the reconfiguration concerning the at least one UE is transmitted 902 to the at least one UE. The message may be transmitted to the at least one UE for example via the DU.

As a first example, the reconfiguration may comprise a release of a PTM leg from the at least one radio bearer.

As a second example, the reconfiguration may comprise an addition of a PTM leg to the at least one radio bearer.

As a third example, the at least one radio bearer may comprise a split common radio bearer comprising a PTP leg and a PTM leg. In this case, the reconfiguration may comprise a release of the split common radio bearer, as well as setting up at least one dedicated radio bearer (DRB) comprising a PTP leg for providing said service to the at least one UE such that one or more dedicated radio bearers are configured per UE.

As a fourth example, the at least one radio bearer may comprise a plurality of dedicated radio bearers configured such that one or more dedicated radio bearers are configured per UE. In this case, the reconfiguration may comprise a release of the plurality of dedicated radio bearers, as well as setting up a split common radio bearer comprising a PTP leg and a PTM leg for providing said service to the at least one UE.

Figure 10:
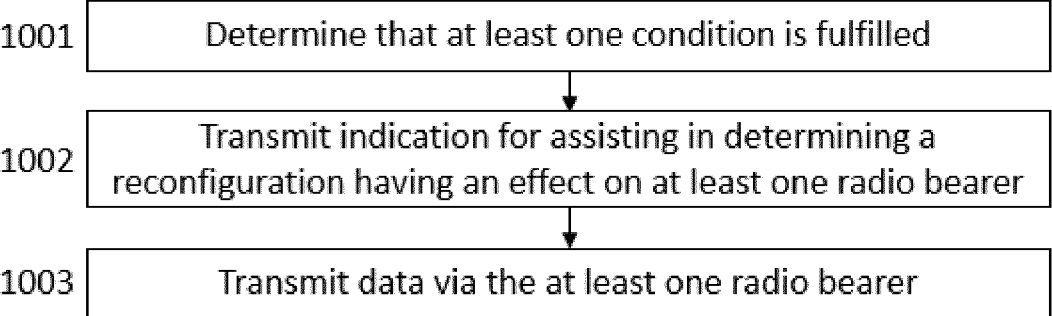

FIG. 10 illustrates a flow chart according to another exemplary embodiment. The functions illustrated in FIG. 10 may be performed by an apparatus such as, or comprised in, a DU. Referring to FIG. 10, it is determined 1001 that at least one condition regarding providing a multicast communication service or a broadcast communication service to at least one UE is fulfilled. Based on the determining, an indication is transmitted 1002 to a CU for assisting the CU in determining a reconfiguration having an effect on at least one radio bearer, the at least one radio bearer comprising at least a PTP leg for providing said service. After the reconfiguration, a set of data associated with the multicast communication service or the broadcast communication service is transmitted 1003 to the at least one UE by utilizing the at least one radio bearer.

For example, the at least one condition may indicate whether or not the at least one UE is evaluated to benefit from a PTM leg. The at least one condition may be determined to be fulfilled based at least partly by comparing a number of UEs with a pre-defined threshold value, wherein the number of UEs are evaluated to benefit from a PTM leg. The number of UEs benefitting from the PTM leg may be determined based at least partly on L1 measurement information from a plurality of UEs comprising at least the number of UEs.

Figure 11:
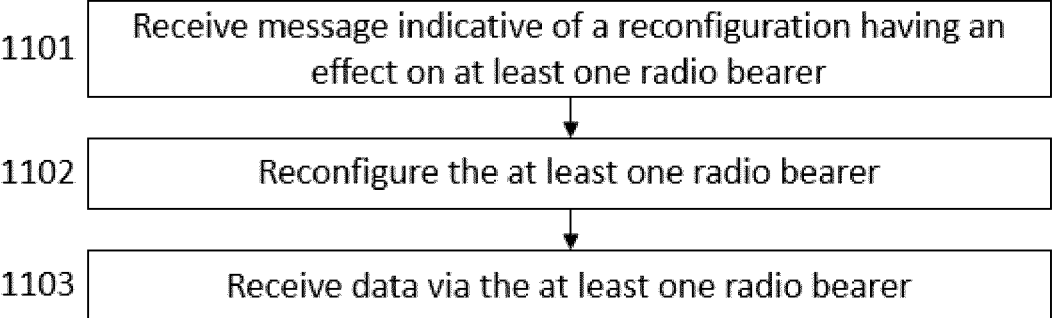

FIG. 11 illustrates a flow chart according to another exemplary embodiment. The functions illustrated in FIG. 11 may be performed by an apparatus such as, or comprised in, a UE. Referring to FIG. 11, a message is received 1101, the message being indicative of a reconfiguration having an effect on at least one radio bearer for providing a multicast communication service or a broadcast communication service to the apparatus, wherein the at least one radio bearer comprises at least a PTP leg for providing said service. The at least one radio bearer is reconfigured 1102 based on the received message. As an example, the received message may be a dedicated message for the UE. As another example, the received message may be a group reconfiguration message. A set of data associated with the multicast communication service or the broadcast communication service is received 1103 from a DU by utilizing the at least one radio bearer.

The functions and/or blocks described above by means of FIGS. 4-11 are in no absolute chronological order, and some of them may be performed simultaneously or in an order differing from the described one. Other functions and/or blocks may also be executed between them or within them.

A technical advantage provided by some exemplary embodiments is that, when the DU estimates that it may not be beneficial to use the PTM delivery mode at least in the short term, then the network can release CFR resources if no UE is configured with them. This may then enable an improved allocation of CFR resources, when PTM is needed again.

Figure 12:
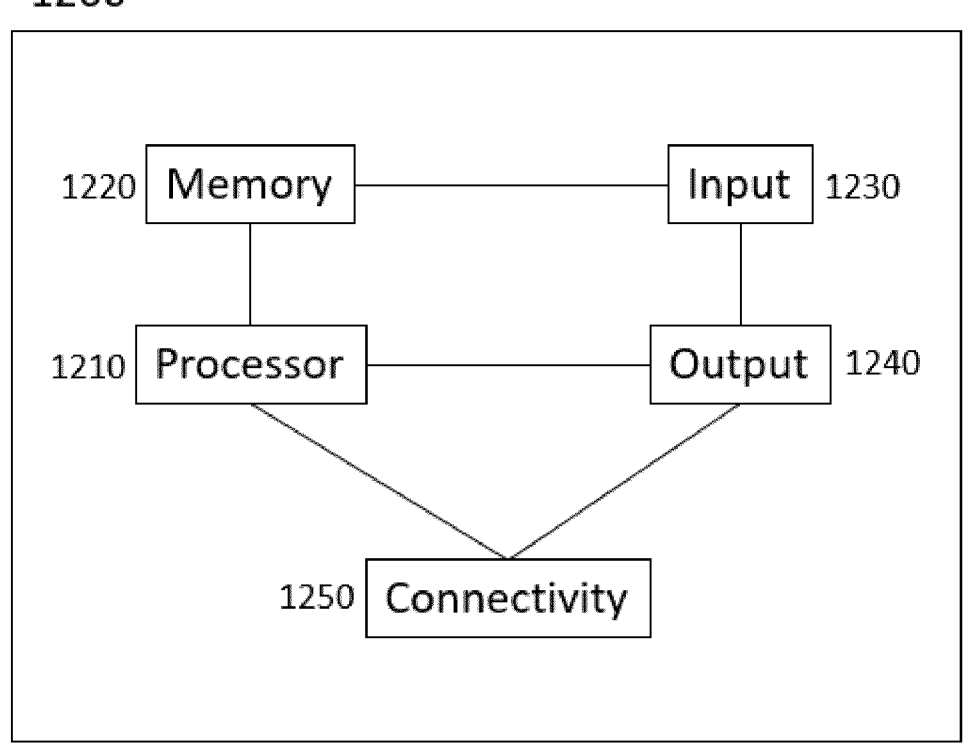
FIGS. 12-13 illustrate apparatuses according to some exemplary embodiments.

FIG. 12 illustrates an apparatus 1200, which may be an apparatus such as, or comprised in, a terminal device, according to an exemplary embodiment. A terminal device may also be referred to as a UE or user equipment herein. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 930 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
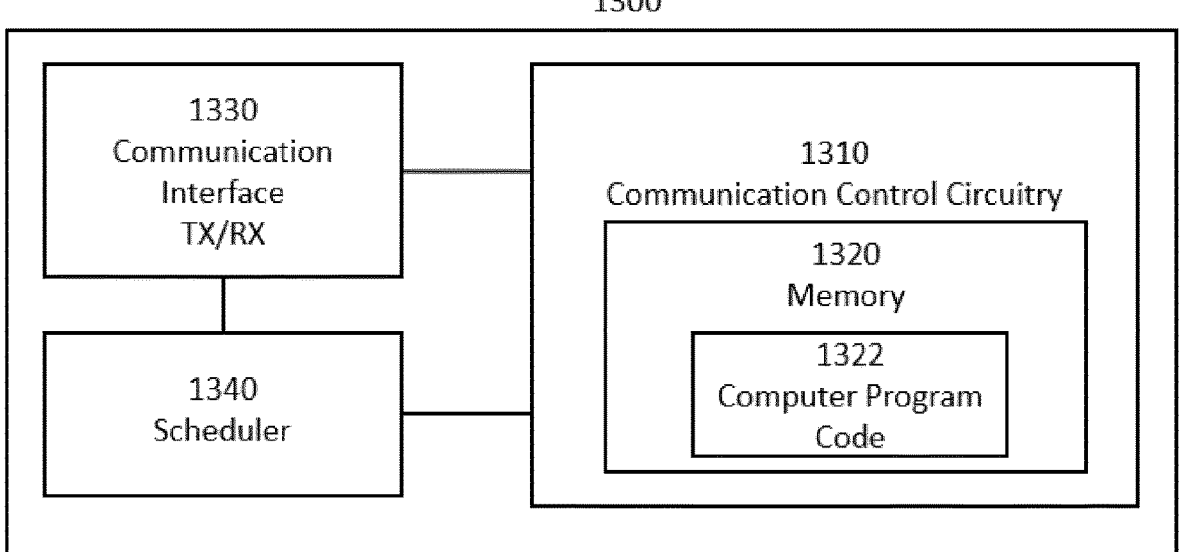

The apparatus 1300 of FIG. 13 illustrates an exemplary embodiment of an apparatus such as, or comprised in, a central unit or a distributed unit. The apparatus may comprise, for example, a circuitry or a chipset applicable for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out some of the exemplary embodiments described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise, or be connected to, a communication interface 1330 comprising hardware and/or software for realizing communication connectivity according to one or more communication protocols. The communication interface 1330 comprises at least one transmitter (TX) and at least one receiver (RX) that may be integrated to the apparatus 1300 or that the apparatus 1300 may be connected to. The communication interface 1330 provides the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

As used in this application, the term "circuitry" may refer to one or more or all of the following: a) hardware-only circuit implementations (such as implementations in only analog and/or digital circuitry), and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions), and c) hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus configured as a central unit, comprising at least one processor, and at least one memory including computer program code, wherein the at least one memory and the computer program code are configured, with the at least one processor, to cause the apparatus to:

receive, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service, wherein the indication comprises a request to reconfigure the at least one radio bearer from a split common radio bearer to a single radio bearer and the reconfiguration comprises a release of a point-to-multipoint leg from the at least one radio bearer, or wherein the indication comprises a request to reconfigure the at least one radio bearer from a single radio bearer to a split common radio bearer and the reconfiguration comprises an addition of a point-to-multipoint leg to the at least one radio bearer; and transmit, to the at least one terminal device, a message indicative of the reconfiguration.

2. The apparatus according to claim 1, wherein the at least one radio bearer comprises the split common radio bearer comprising the point-to-multipoint leg, wherein the reconfiguration comprises a release of the split common radio bearer;

wherein the reconfiguration further comprises setting up at least one dedicated radio bearer comprising a point-to-point leg for providing said service to the at least one terminal device such that one or more dedicated radio bearers are configured per terminal device.

3. The apparatus according to claim 1, wherein the at least one radio bearer comprises a plurality of dedicated radio bearers configured such that one or more dedicated radio bearers are configured per terminal device, wherein the reconfiguration comprises a release of the plurality of dedicated radio bearers;

wherein the reconfiguration further comprises setting up a split common radio bearer comprising a point-to-point leg and a point-to-multipoint leg for providing said service to the at least one terminal device.

4. The apparatus according to claim 1, wherein the reconfiguration is transmitted to a plurality of terminal devices by using a group radio resource control reconfiguration message, or by using a plurality of individual radio resource control reconfiguration messages.

5. The apparatus according to claim 1, wherein a part of the reconfiguration is associated with the distributed unit;

wherein said part of the reconfiguration is received within or together with the indication received from the distributed unit.

6. The apparatus according to claim 1, wherein the apparatus is further caused to:

transmit, to the distributed unit, a request for enabling or disabling the distributed unit to transmit the indication to the apparatus.

7. The apparatus according to claim 1, wherein the indication received from the distributed unit comprises at least a request for triggering the reconfiguration.

8. The apparatus according to claim 1, wherein the indication received from the distributed unit comprises at least layer 1 measurement information associated with a plurality of terminal devices comprising the at least one terminal device.

9. An apparatus configured as a distributed unit, comprising at least one processor, and at least one memory including computer program code, wherein the at least one memory and the computer program code are configured, with the at least one processor, to cause the apparatus to:

determine that at least one condition regarding providing a multicast communication service or a broadcast communication service to at least one terminal device is fulfilled;

based on the determining, transmit, to a central unit, an indication for assisting the central unit in determining a reconfiguration having an effect on at least one radio bearer, the at least one radio bearer comprising at least a point-to-point leg for providing said service, wherein the indication comprises a request to reconfigure the at least one radio bearer from a split common radio bearer to a single radio bearer or a request to reconfigure the at least one radio bearer from a single radio bearer to a split common radio bearer; and transmit, to the at least one terminal device, a set of data associated with the multicast communication service or the broadcast communication service by utilizing the at least one radio bearer.

10. The apparatus according to claim 9, wherein the at least one condition indicates whether or not the at least one terminal device is evaluated to benefit from a point-to-multipoint leg.

11. The apparatus according to claim 9, wherein the at least one condition is determined to be fulfilled based at least partly by comparing a number of terminal devices with a pre-defined threshold value, wherein the number of terminal devices are evaluated to benefit from a point-to-multipoint leg;

wherein the number of terminal devices benefitting from the point-to-multipoint leg is determined based at least partly on layer 1 measurement information from a plurality of terminal devices comprising at least the number of terminal devices.

12. The apparatus according to claim 9, wherein the at least one radio bearer comprises the split common radio bearer comprising the point-to-multipoint leg, wherein the reconfiguration comprises a release of the split common radio bearer;

wherein the reconfiguration further comprises setting up at least one dedicated radio bearer comprising a point-to-point leg for providing said service to the at least one terminal device such that one or more dedicated radio bearers are configured per terminal device.

13. The apparatus according to claim 9, wherein the at least one radio bearer comprises a plurality of dedicated radio bearers configured such that one or more dedicated radio bearers are configured per terminal device, wherein the reconfiguration comprises a release of the plurality of dedicated radio bearers;

wherein the reconfiguration further comprises setting up a split common radio bearer comprising a point-to-point leg and a point-to-multipoint leg for providing said service to the at least one terminal device.

14. The apparatus according to claim 9, wherein the apparatus is further caused to:

receive, from the central unit, a message comprising a reconfiguration message indicative of the reconfiguration;

transmit, to the at least one terminal device, the reconfiguration message indicative of the reconfiguration.

15. A method for a central unit, the method comprising:

receiving, from a distributed unit, an indication for assisting in determining a reconfiguration having an effect on at least one radio bearer for providing a multicast communication service or a broadcast communication service to at least one terminal device, the at least one radio bearer comprising at least a point-to-point leg for providing said service, wherein the indication comprises a request to reconfigure the at least one radio bearer from a split common radio bearer to a single radio bearer and the reconfiguration comprises a release of a point-to-multipoint leg from the at least one radio bearer, or wherein the indication comprises a request to reconfigure the at least one radio bearer from a single radio bearer to a split common radio bearer and the reconfiguration comprises an addition of a point-to-multipoint leg to the at least one radio bearer; and transmitting, to the at least one terminal device, a message indicative of the reconfiguration.

16. A method for a distributed unit, the method comprising:

determining that at least one condition regarding providing a multicast communication service or a broadcast communication service to at least one terminal device is fulfilled;

based on the determining, transmitting, to a central unit, an indication for assisting the central unit in determining a reconfiguration having an effect on at least one radio bearer, the at least one radio bearer comprising at least a point-to-point leg for providing said service, wherein the indication comprises a request to reconfigure the at least one radio bearer from a split common radio bearer to a single radio bearer or a request to reconfigure the at least one radio bearer from a single radio bearer to a split common radio bearer; and transmitting, to the at least one terminal device, a set of data associated with the multicast communication service or the broadcast communication service by utilizing the at least one radio bearer.

\* \* \* \* \*